United States Patent [19]

Inaba et al.

[11] Patent Number: 5,805,129

[45] Date of Patent: *Sep. 8, 1998

[54] INHIBITING TRANSITION OF A SURFACE STABILIZATION STATE IN A FERROELECTRIC LIQUID CRYSTAL ELEMENT USING ALTERNATING VOLTAGES

[75] Inventors: Yutaka Inaba, Kawaguchi; Shinjiro Okada, Hiratsuka; Osamu Taniguchi, Chigasaki; Hironobu Mizuno, Hiratsuka, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 568,298

[22] Filed: Dec. 6, 1995

Related U.S. Application Data

[62] Division of Ser. No. 280,583, Jul. 26, 1994, Pat. No. 5,500,749, which is a continuation of Ser. No. 816,577, Jan. 3, 1992, abandoned.

[30] Foreign Application Priority Data

Jan. 8, 1991 [JP] Japan .................................. 3-011529

[51] Int. Cl.$^6$ ..................................................... G02F 1/133
[52] U.S. Cl. ............................................................. 345/97
[58] Field of Search ............................... 345/97, 96, 100, 345/92, 94–95

[56] References Cited

U.S. PATENT DOCUMENTS

| | | |
|---|---|---|
| 4,682,858 | 7/1987 | Kanbe et al. . |
| 4,715,688 | 12/1987 | Harada et al. . |
| 4,778,259 | 10/1988 | Kitayama . |
| 4,813,767 | 3/1989 | Clark et al. . |
| 4,844,590 | 7/1989 | Okada et al. . |
| 4,879,059 | 11/1989 | Hanyu et al. . |
| 4,898,456 | 2/1990 | Okada et al. . |
| 4,900,132 | 2/1990 | Bos . |
| 4,902,107 | 2/1990 | Tsuboyama et al. . |
| 4,923,285 | 5/1990 | Ogino et al. . |
| 4,925,277 | 5/1990 | Inaba ........................................ 345/97 |
| 4,932,758 | 6/1990 | Hanyu et al. . |
| 5,013,137 | 5/1991 | Tsuboyama et al. . |
| 5,107,354 | 4/1992 | Yamazaki . |
| 5,136,282 | 8/1992 | Inaba et al. . |
| 5,151,804 | 9/1992 | Verhulst et al. . |
| 5,182,549 | 1/1993 | Taniguchi et al. . |
| 5,189,536 | 2/1993 | Hanyu et al. . |
| 5,252,954 | 10/1993 | Nagata et al. . |
| 5,267,065 | 11/1993 | Taniguchi et al. ........................ 345/97 |
| 5,321,419 | 6/1994 | Katakura et al. ......................... 345/97 |
| 5,379,138 | 1/1995 | Okada . |
| 5,400,048 | 3/1995 | Shimada et al. .......................... 345/97 |
| 5,532,713 | 7/1996 | Okada et al. ............................. 345/97 |
| 5,583,534 | 12/1996 | Katakura et al. ......................... 345/97 |

FOREIGN PATENT DOCUMENTS 60-33535  2/1985  Japan .

OTHER PUBLICATIONS

J. M. Geary, SID 1985 Digest of Technical Papers (1985) 128–30.

A. Jakli et al., Ferroelectrics, vol. 69, No. 3/4 (1986) 153–63.

Primary Examiner—Mark R. Powell
Attorney, Agent, or Firm—Fitzpatrick, Cella, Harper & Scinto

[57] ABSTRACT

A ferroelectric liquid crystal element with plural surface stabilization states is driven by applying, during a transition inhibition period, an alternating voltage to generate an electric field in the liquid crystal portion in which no transition of a surface stabilization state occurs. The value of the alternating voltage is set not to be greater than that which generates in the liquid crystal a shear stress based on the drive force that is equal to the static frictional force at the interfaces between the surfaces of the electrode substrates and the liquid crystal molecules.

6 Claims, 10 Drawing Sheets

INHIBITING TRANSITION OF A SURFACE STABILIZATION STATE IN A FERROELECTRIC LIQUID CRYSTAL ELEMENT USING ALTERNATING VOLTAGES

This application is a division of application Ser. No. 08/280,583, filed Jul. 26, 1994 (now U.S. Pat. No. 5,500, 749, issued Mar. 19, 1996), which is a continuation of application Ser. No. 07/816,577, filed Jan. 3, 1992, now abandoned.

BACKGROUND OF THE INVENTION

1. Field of the Invention

The present invention relates to a method of manufacturing a ferroelectric liquid crystal element used in, e.g., graphic display.

2. Related Background Art

A surface stabilization ferroelectric liquid crystal (to be referred to as an SSFLC hereinafter) is realized in such a manner that a ferroelectric liquid crystal (to be referred to as an FLC hereinafter) is clamped in a gap between two substrates, and the substrate gap is sufficiently decreased to cause a helical structure of the FLC to disappear. The SSFLC is often utilized in a chiral smectic C phase. As is known, in the smectic phase, liquid crystal molecules form a layered structure. In the SSFLC, the layers have alignment structures shown in FIGS. 2A to 2D. The layered structure shown in FIG. 2A is normally called a bookshelf type. In this structure, the layers are perpendicular to substrates 21 and 22. The structure of this type can be formed by applying a strong alternating electric field to an SSFLC having one of the alignment structures shown in FIGS. 2B to 2D. The structure shown in FIG. 2B is of inclined bookshelf type, and appears when substrates subjected to an alignment treatment with a large pre-tilt angle are adhered to each other in an anti-parallel state. The structures shown in FIGS. 2C and 2D are of a so-called chevron type, and appear when substrates subjected to a rubbing treatment are adhered to each other so that rubbing directions A of the upper and lower substrates are almost parallel to each other. The type shown in FIG. 2C is stable at a high temperature, and the type shown in FIG. 2D appears through zig-zag defects in a process wherein the temperature of the type shown in FIG. 2C is decreased.

The relationship between the layered structures shown in FIGS. 2C and 2D and a temperature is known to those who are skilled in the art. Alignment states of the type shown in FIG. 2C include four surface stabilization states. Two out of these four states are so-called spray alignment states wherein directors are twisted between the upper and lower substrates. The remaining two states are so-called uniform alignment states wherein directors are almost uniform between the upper and lower substrates. It is presumed that these alignment states correspond to alignment states shown in FIG. 3 under an assumption that directors are present on a cone defined by the helical structure of the smectic C phase. In FIG. 3, a to d represent arrangements of C directors when the cone is viewed from its bottom surface. More specifically, a and b indicate the spray alignment states, and c and d indicate uniform alignment states. An arrow 31 indicates the direction of spontaneous polarization. Of these surface stabilization states, the uniform alignment states c and d are used in a display element, thereby realizing a high-contrast display.

However, when the uniform alignment state is used as a display element, a so-called "printing" phenomenon often occurs. In this phenomenon, when the display element set in one display state is kept driven for a long period of time, the display content is fixed, and slightly remains even when the display content is rewritten. In order to prevent this phenomenon, the present inventors found that alignment treatment substrates having a large pre-tilt angle could be used. However, when the pre-tilt angle is increased, another problem to be described below is posed.

The FLC is normally used in the form of a simple matrix display element. In a popular drive method in this case, as disclosed in Japanese Laid-Open Patent Application No. 60-33535, a voltage equal to or higher than a threshold value is applied to pixels on a selected scanning line to determine an ON or OFF state, and an alternating voltage signal is applied to pixels on a non-selected scanning line. However, when an identical display state is maintained for a long period of time in the uniform alignment state in this drive method, image quality is degraded, and the display element cannot withstand long-time use.

SUMMARY OF THE INVENTION

The present invention has been made in consideration of the conventional problems, and has as its object to provide a ferroelectric liquid crystal element, which can prevent image quality from being degraded even when a pre-tilt angle is large.

In order to achieve the above object, according to the present invention, there is provided a ferroelectric liquid crystal element, which is constituted by holding a chiral smectic liquid crystal exhibiting ferroelectricity between electrode substrates, and in which the liquid crystal presents a plurality of surface stabilization states according to an electric field applied through the electrode substrates, and an alternating electric field having a strength equal to or higher than a constant value is applied during a period for inhibiting transition of the surface stabilization state, and to a corresponding liquid crystal portion, within a range causing no transition, wherein the strength of the alternating electric field to be applied during the period for inhibiting transition of the surface stabilization state, and to the corresponding liquid crystal portion is set to be equal to or lower than a predetermined value which does not cause the liquid crystal to flow.

DETAILED DESCRIPTION OF THE PREFERRED EMBODIMENTS

Figure 1:
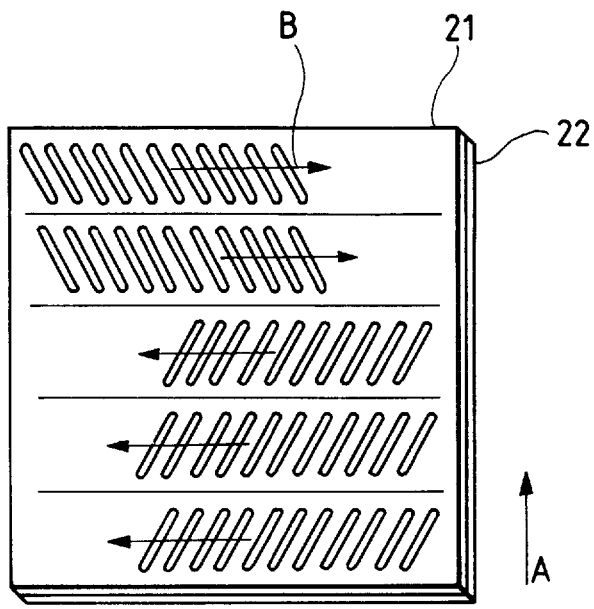
FIG. 1 is a view showing a flow of an SSFLC layer in a uniform state.
Figure 2A:
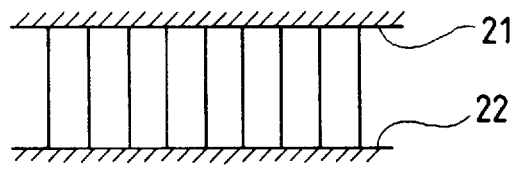
FIGS. 2A to 2D are views showing alignment structures of the SSFLC layer.
Figure 2B:
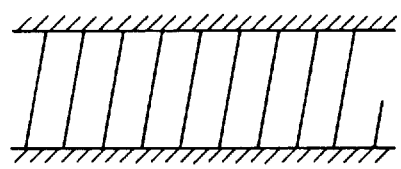
Figure 2C:
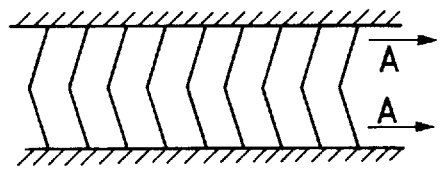
Figure 2D:
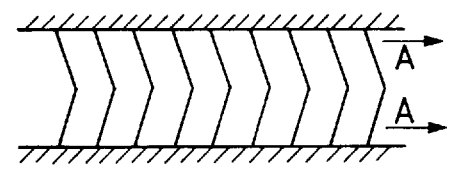

In a liquid crystal, for example, if an alternating electric field exceeding a predetermined value is applied to cause the flow of the liquid crystal, the direction of the flow is reversed according to the positive or negative level of the alternating electric field. The direction of the flow varies depending on surface stabilization states. The velocity of the flow is low when the direction of the alternating electric field is the same as an average direction of spontaneous polarization of the liquid crystal in an electric field non-application state, and is high when the direction of the alternating electric field is opposite to the average direction.

A smectic layer of a liquid crystal is, for example, bent, and if the liquid crystal is caused to flow, an average molecular axis direction of the liquid crystal in an electric field application state is present inside an angle defined by a bisector direction of the bent corner, i.e., an outward direction of the bent corner, and the direction of the flow of the liquid crystal.

A force for causing the flow of the liquid crystal is proportional to the strength of an electric field to be applied, and a force, from an electrode substrate surface, for blocking the flow of the liquid crystal varies depending on a direction to cause the flow.

The pre-tilt angle of the liquid crystal near the substrate in each stable state varies depending on, e.g., a gap between opposing electrode substrates.

More specifically, for example, the opposing electrode substrates have a scanning electrode group for applying an electric field to the liquid crystal, and an information electrode group crossing the scanning electrode group. Each crossing portion forms a pixel. In a scanning mode of the scanning electrodes, an electric field having a strength equal to or higher than a threshold value for causing transition of a surface stabilization state is applied to pixels on the selected scanning electrode, thus transiting the surface stabilization state of the pixels. Meanwhile, an electric field equal to or higher than a constant value within a range wherein no transition occurs, and equal to or lower than a predetermined value which does not cause the flow of the liquid crystal is applied to pixels on the non-selected scanning electrode.

In this arrangement, the strength of the alternating electric field, which is to be applied during a period for inhibiting transition of the surface stabilization state, and to the corresponding liquid crystal portion, and has a strength equal to or higher than the constant value within the range causing no transition is further limited to be equal to or lower than the predetermined value. For this reason, even when an identical display state continues for a long period of time, the cell thickness will not be changed due to the flow of the liquid crystal. Therefore, even when the display is used for a long period of time, image quality can be prevented from being degraded, and good image quality can be maintained. This effect will be explained in more detail below.

In the above-mentioned method of applying an alternating voltage signal to pixels on a non-selected scanning line, the present inventors revealed from their experiments that when the pre-tilt angle was large, the liquid crystal flowed in one direction when a drive operation was performed for a long period of time. As indicated by arrows B in FIG. 1, the directions of the flows are parallel to a smectic layer, and are opposite to each other in two uniform stabilization states. Note that polymer alignment films on the opposing surfaces of substrates 21 and 22 are subjected to a rubbing treatment, and these substrates are adhered to each other, so that rubbing directions A of these substrates are parallel to each other. Due to this phenomenon, when an identical display state continues for a long period of time in a uniform alignment state, image quality is degraded since, e.g., the cell thickness is changed, thus disturbing long-time use. The present inventors found first that the flow could be eliminated to a practical level by setting a voltage to be applied to pixels on a non-selected scanning line to be equal to or lower than a constant value determined by the cell thickness.

Figure 4:
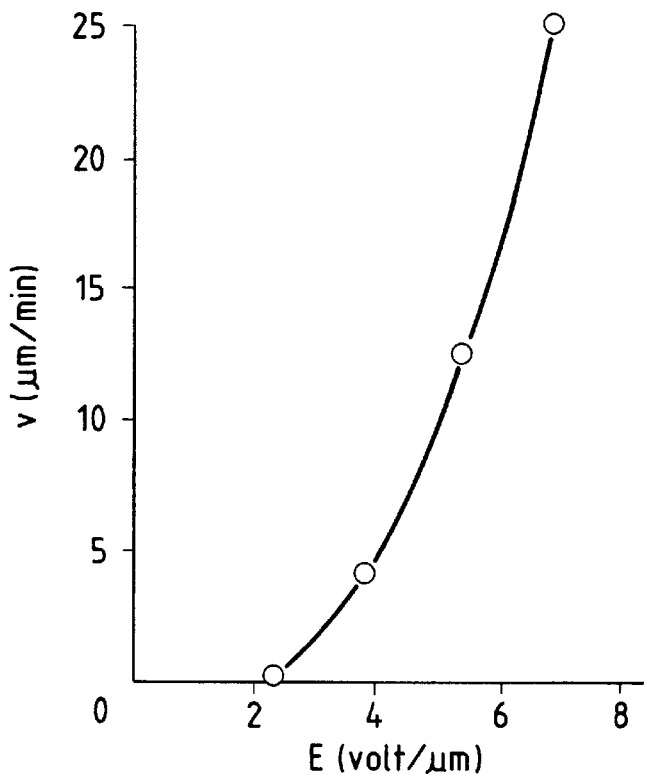
FIG. 4 is a graph showing nature of a flow of the SSFLC layer in a uniform state.

FIG. 4 is a graph showing results obtained by measuring a state wherein a velocity v of the flow depends on a peak value V of a non-selection application voltage. An electric field strength E=V/d is plotted along the abscissa (where d is the cell thickness, and is 1.3 μm in this case). A liquid crystal used in the measurement is a solution mixture containing phenylpyrimidine as a major component, and having a spontaneous polarization value Ps=−6.6 nC/cm² at 30° C., and its phase change is expressed by:

(1)

The flow clearly occurs when the electric field strength E≦2 V/μm. However, when E<2 V/μm, the flow is zero or unmeasurably small. In this case (d=1.3 μm), when a drive operation is performed with the peak value V≦2.6 V, no practical problem is posed even when the drive operation continues for a long period of time.

Figure 5:
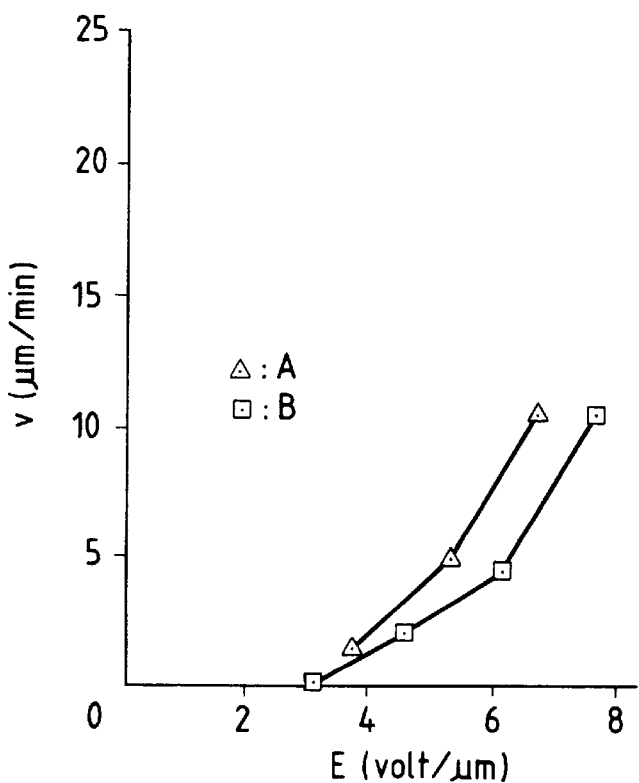
FIG. 5 is a graph showing nature of a flow of the SSFLC layer in the uniform state for two liquid crystals different from the case shown in FIG. 4.

FIG. 5 shows measurement results when other liquid crystal materials A and B were used. The electric field strength is similarly plotted along the abscissa. The cell thickness is standardized to be about 1.3 μm. In this case, the flow also occurs at a given electric field strength or higher, and is unmeasurably small at E=3 V/μm or lower. The liquid crystals A and B used in the measurement respectively have spontaneous polarization values Ps of −5 nC/cm² and −3.8 nC/cm² at 30° C., and respectively have the following phase series characteristics 2̂ and 3̂.

Liquid Crystal A

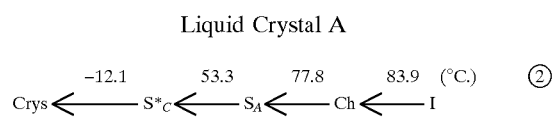

(2)

Liquid Crystal B

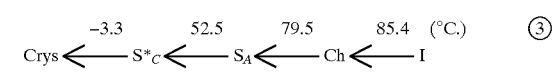

(3)

Figure 3:
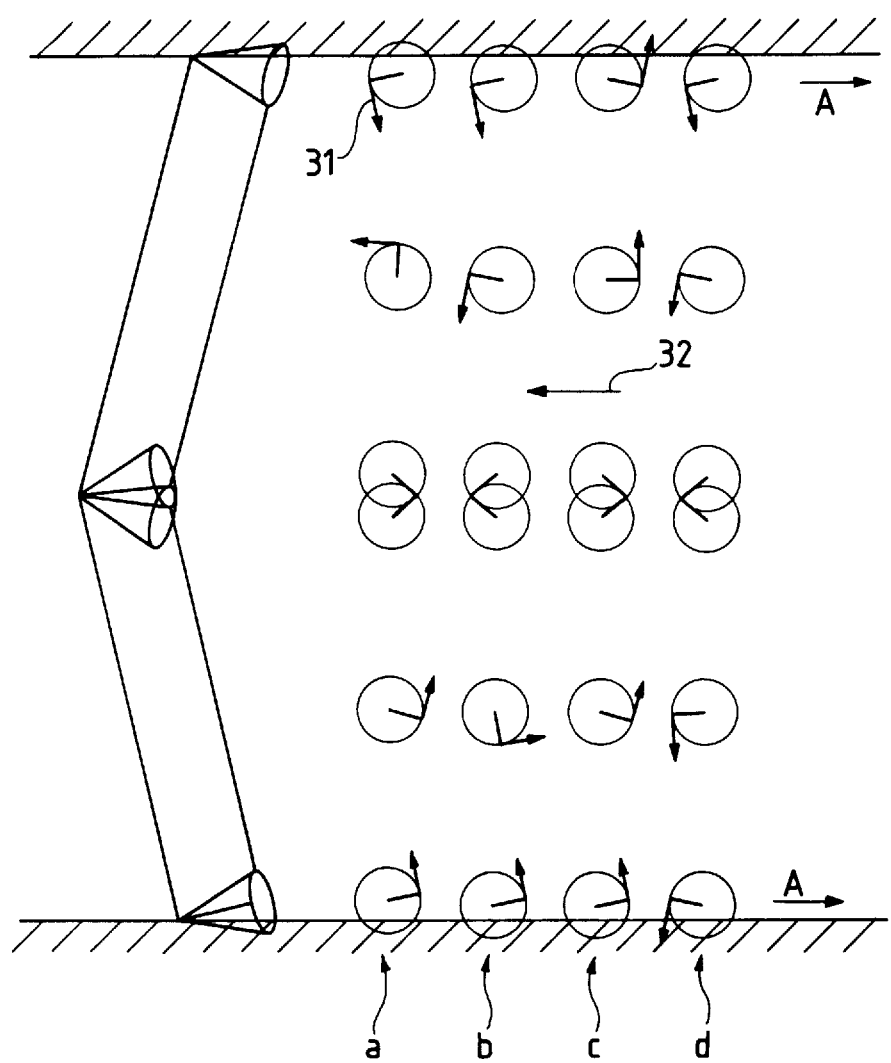
FIG. 3 is a view showing alignment states of the SSFLC layer.
Figure 6A:
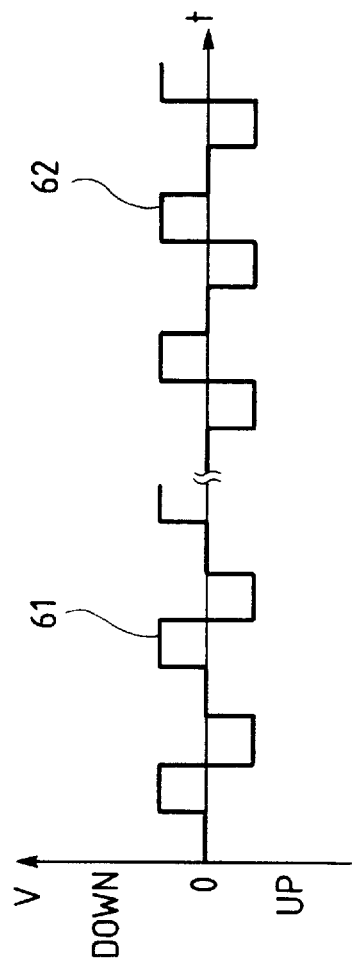
FIGS. 6A to 6C are respectively a waveform chart of an alternating rectangular wave electric field to be applied to the SSFLC layer, and graphs showing optical response characteristics.
Figure 6B:
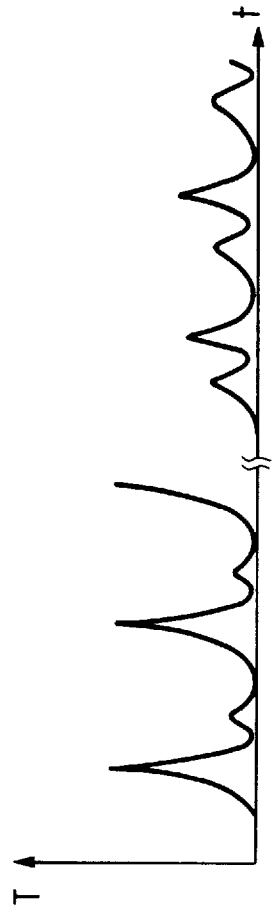
Figure 6C:
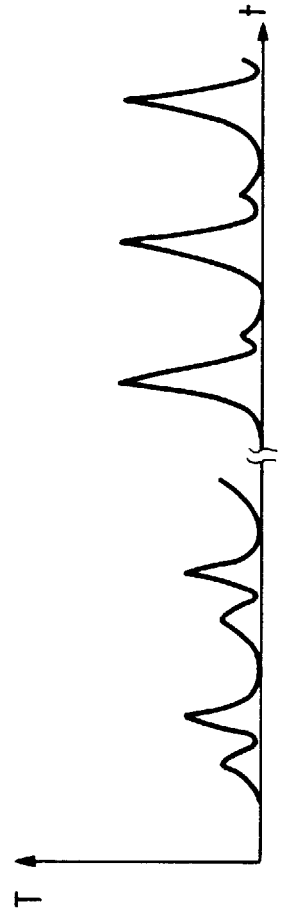

As for alternating voltages having the same amplitude, upon comparison between two application voltage waveforms 61 and 62 having rest periods, as shown in FIG. 6A, the flow is easy to occur for the alternating voltage having the waveform 61, and is difficult to occur for the alternating voltage having the waveform 62 in an up state wherein the direction of spontaneous polarization is directed upward like in the alignment state c shown in FIG. 3. A phenomenon opposite to that described above occurs in a down state. FIG. 6B shows optical response characteristics (transmittance T) in the up state when the alternating voltage shown in FIG. 6A is applied, and FIG. 6C shows optical response characteristics in the down state. Note that FIGS. 6B and 6C show a case wherein a polarization plate (crossed nicols) is arranged at a position where the darkest state is attained in a non-electric field state. As can be seen from these figures, liquid crystal molecules are moved more or less even at the alternating voltages equal to or lower than a threshold value, and as the moving amount is increased, the flow becomes larger. The liquid crystal molecules are moved largely upon application of an electric field in a down direction in the up state, and are moved largely in the down state upon application of an electric field having an up direction.

As can be understood from these facts, the liquid crystal molecules are moved in a vibration manner in the flow direction in response to the positive or negative level of an electric field. In addition, the liquid crystal molecules are moved slightly upon application of the electric field in the same direction as the direction of spontaneous polarization, and are moved largely upon application of the electric field in the opposing direction. As a result, the flow in one direction is generated as a net movement.

The flow velocity strongly depends on the electric field strength, and the reason why almost no flow occurs at an electric field equal to or lower than a given critical value is not clear yet, but can be considered as follows. More specifically, when a downward electric field equal to or lower than a switching threshold value is applied in the case of the director arrangement in the alignment state c in FIG. 3 (spontaneous polarization is directed upward, i.e., the up state), since C directors having a large pre-tilt angle, and located near the interface are located at a position of a higher phase angle than the edges of cones, a director near the upper substrate is rotated clockwise on the cone, and a director near the lower substrate is rotated counterclockwise. When the directors are moved on the cone, the molecule itself is rotated about its major axis, as indicated by an arrow 71 in FIG. 7A. When the director makes a round on the cone, the molecule also completes one revolution. When molecules make revolutions in the same direction, a shear stress 72 is generated in the liquid crystal, as shown in FIG. 7B. The shear stress changes its sign (direction) according to the revolution direction of molecules, in other words, a positive or negative rotational direction of the director on the cone. Therefore, in the structure in the alignment state c in FIG. 3, the shear stress have opposing directions in upper and lower halves of a chevron, and the liquid crystal receives a force to the left (in a direction of an arrow 32) as a whole. When an upward electric field is applied, since rotations and a shear stress opposite to the case described above are generated, the liquid crystal receives a force to the right as a whole. When an alternating electric field having symmetric positive and negative levels is applied, the liquid crystal continuously receives a force alternating to the right and left. Therefore, when the director is fixed in position, the sign of the shear stress is merely changed in correspondence with a change in sign of the electric field. Therefore, the force based on the upward electric field has the same magnitude as the force based on the downward electric field.

Figure 8A:
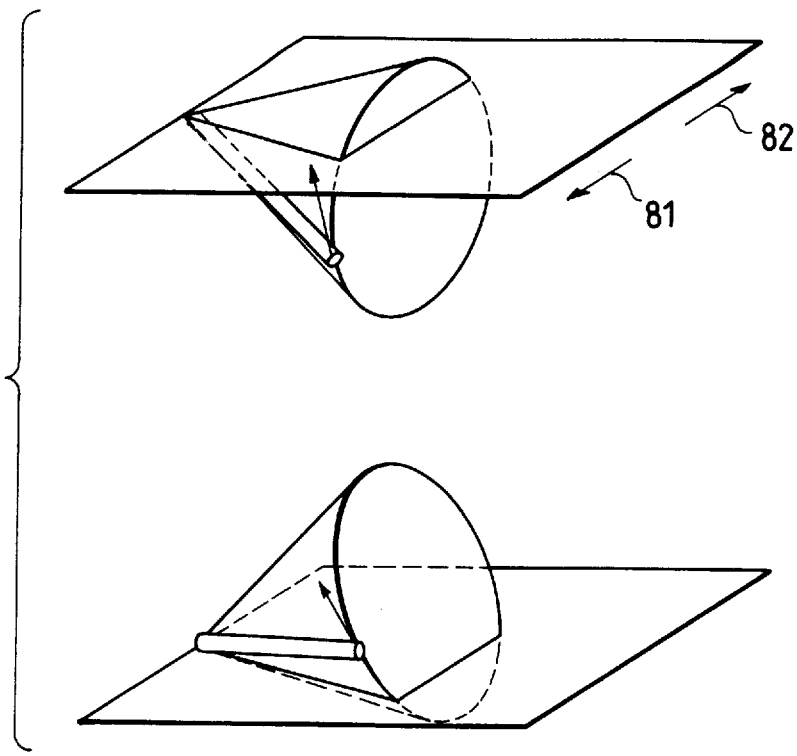
FIGS. 8A and 8B are views showing arrangements of liquid crystal molecules at upper and lower substrate interfaces.

With these forces, the liquid crystal is moved to the right and left in the smectic layer. Since the magnitudes of the forces are balanced, it seems that a net flow will not occur. However, when the liquid crystal is moved relative to the substrate, it receives a frictional force from the substrate, and the frictional force must also be taken into consideration. It is considered that the pre-tilt angles of the upper and lower substrate interfaces are not equal to each other, as shown in FIG. 8A since they vary depending on the directions of polarization of the liquid crystal. In this case, forces at which the substrates thrust the liquid crystal must be different from each other at the upper and lower substrate interfaces due to the above-mentioned shear stress. When a difference between these forces is small, the flow velocity at the interface is zero, and both the upper and lower substrates give a thrust to the liquid crystal. On the other hand, when the difference between the two forces is large, perhaps, the lower substrate interface gives a large thrust, thereby flowing the liquid crystal. In this case, at the upper substrate interface, the liquid crystal is moved relative to the substrate. At this time, the upper substrate gives, to the liquid crystal, a frictional force opposing the flow rather than a thrust. The frictional force is determined by the shape of the substrate surface and the arrangement of interface liquid crystal molecules. Since the interface liquid crystal molecule is asymmetrically arranged in the right and left directions, the right and left magnitudes of a frictional resistance are also different from each other. Upon comparison with actually measured directions, a resistance when the liquid crystal flows to the right (a direction of an arrow 82) is large, and a resistance when it flows to the left (a direction of an arrow 81) is small. For this reason, the flow occurs in one direction (left).

Figure 8B:
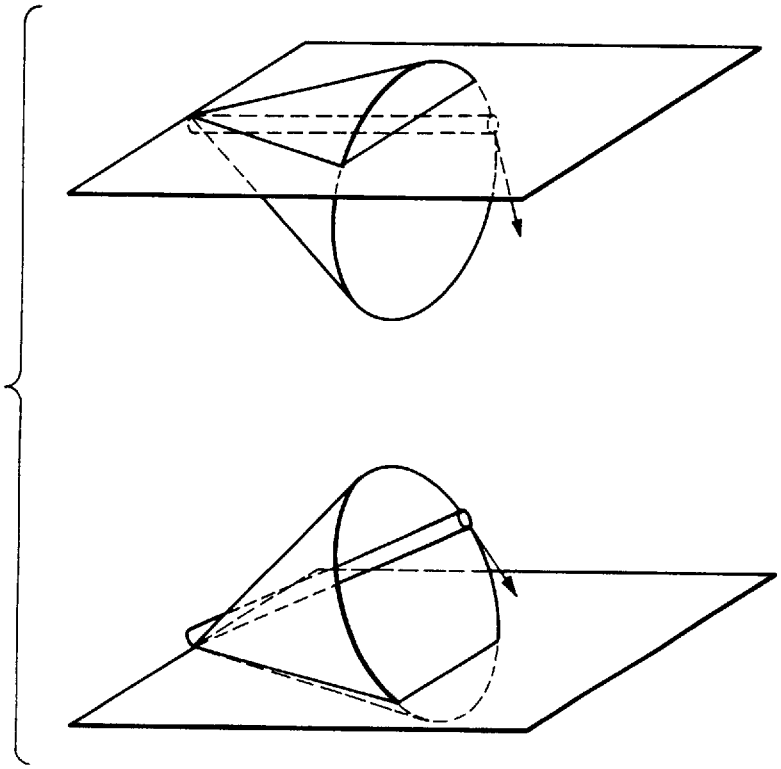

The above discussion has been made about the alignment state c (up state) shown in FIG. 3. The same applies to the alignment state d (down state) shown in FIG. 3. The down state is established by rotating the up state through 180° about an axis passing through the bending point of a chevron, and perpendicular to the drawing surface of FIG. 3, and has a director arrangement at the substrate interface opposite to that shown in FIG. 8A, as shown in FIG. 8B. However, as can be seen from the above description, since the shear stress and the frictional force at the interface have the same magnitudes as those in the up state, their directions are reversed. As a result, in the down state, the liquid crystal flows in a direction opposite to that in the up state.

Figure 7A:
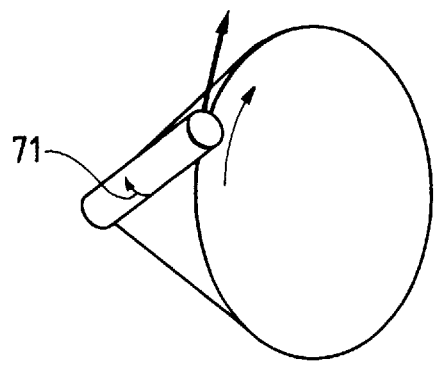
FIGS. 7A and 7B are explanatory views of the principle of generating a shear stress in the SSFLC layer.
Figure 7B:
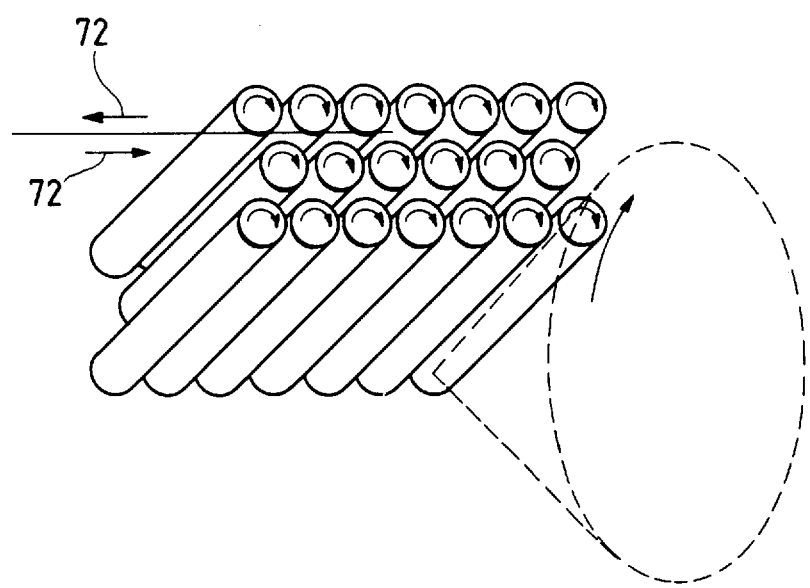

Furthermore, the shear stress that has been described with reference to FIGS. 7A and 7B is proportional to the revolution velocity of a molecule, i.e., a moving velocity of a director on the cone. Since the moving velocity of the director on the cone is almost proportional to an electric field strength if an elastic strain is neglected, the shear stress acts more strongly as the electric field strength is increased. On the other hand, it is considered that frictional forces with the substrate include a static frictional force obtained when the liquid crystal at the interface is not moved relative to the substrate, and a dynamic frictional force obtained when the liquid crystal is moved. When a drive force based on the shear stress is small, the flow of the liquid crystal as a whole is slow, and since it can be considered that the liquid crystal does not flow at the substrate interface, the former frictional force is dominant. On the other hand, when the drive force is increased, the liquid crystal flows even at the substrate interface, and the latter frictional force becomes dominant. In the former case, since the liquid crystal moves according to the equation of fluid motion under a condition of a flow velocity=0 at the interface, the magnitude of the static frictional force does not contribute to the motion of fluid. Therefore, the right and left movements of the liquid crystal in the layer are symmetrical since the drive force is uniform, and a net flow is zero. However, in the latter case, since the motion of fluid depends on the magnitude of the dynamic frictional force, a net flow is generated since the right and left frictional forces have different magnitudes, as described above. This is the reason why the flow has threshold dependency on the electric field strength.

As described above, according to the present invention, since the strength of an alternating electric field to be applied during a period for inhibiting transition of a surface stabilization state, and to a corresponding liquid crystal portion is set to be equal to or smaller than a predetermined value that does not cause the liquid crystal to flow, the cell thickness can be prevented from being changed by the liquid crystal flow even when an identical display state continues for a long period of time. Therefore, good image quality free from degradation can be maintained even if the liquid crystal element is used for a long period of time.

The predetermined value includes two kinds of values. That is, the first predetermined value is a critical voltage at a constant frequency, and the second predetermined value is a critical voltage under a condition that a frequency is changed together with a voltage, and a selection pulse coincides with a switching threshold value at that frequency. Which value is to be used is determined depending on a given drive condition. More specifically, a drive method that has a limitation, i.e., must maintain a constant drive frequency, employs the first critical voltage. This case corresponds to an application to, e.g., a display such as a television. In contrast to this, in a display device having no limitation on a drive frequency, it is proper to set the second critical voltage or less while decreasing a frequency as much as possible. In the case of a display device of a computer terminal, data communications with a main body computer are adjusted, so that the display device is not always driven at a TV rate. The latter case corresponds to this application.

Example 1

Figure 10:
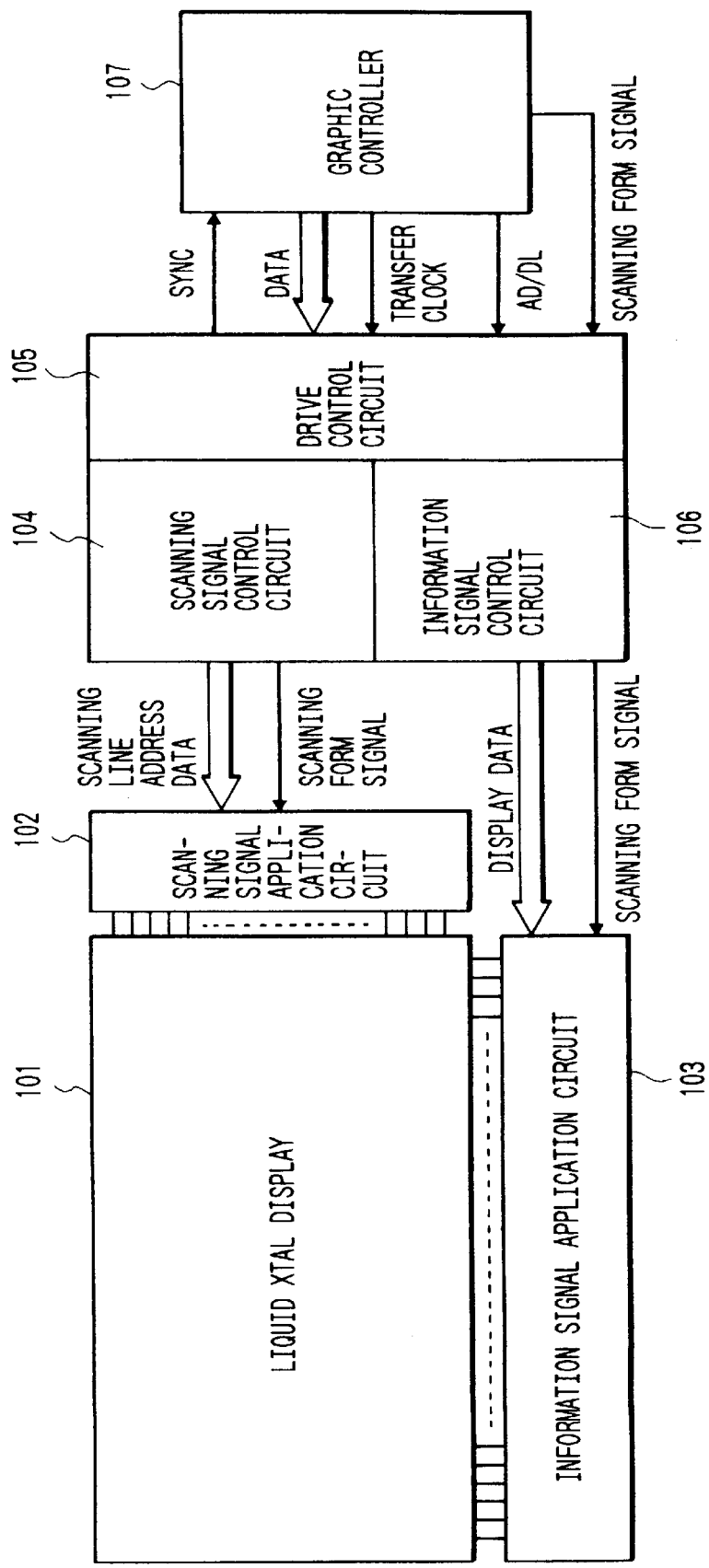
FIG. 10 is a view showing the drive circuit of the present invention.

FIG. 10 shows an example of the present invention. A system shown in FIG. 10 includes a graphic controller 107, a drive control circuit 105, a scanning signal control circuit 104, an information signal control circuit 106, a scanning signal application circuit 102, an information signal application circuit 103, and a liquid crystal display 101.

Data and a scanning form signal sent from the graphic controller 107 are input to the drive control circuit 104 and the information signal control circuit 106. The data is converted into address data and display data, and the scanning form signal is supplied directly to the scanning signal application circuit 102 and the information signal application circuit 103. The scanning signal application circuit 102 applies a scanning signal waveform determined by the scanning form signal to a scanning electrode determined by the address data. The information signal application circuit 103 applies an information signal waveform determined by a black or white display content input as the display data, and the scanning form signal.

Figure 11:
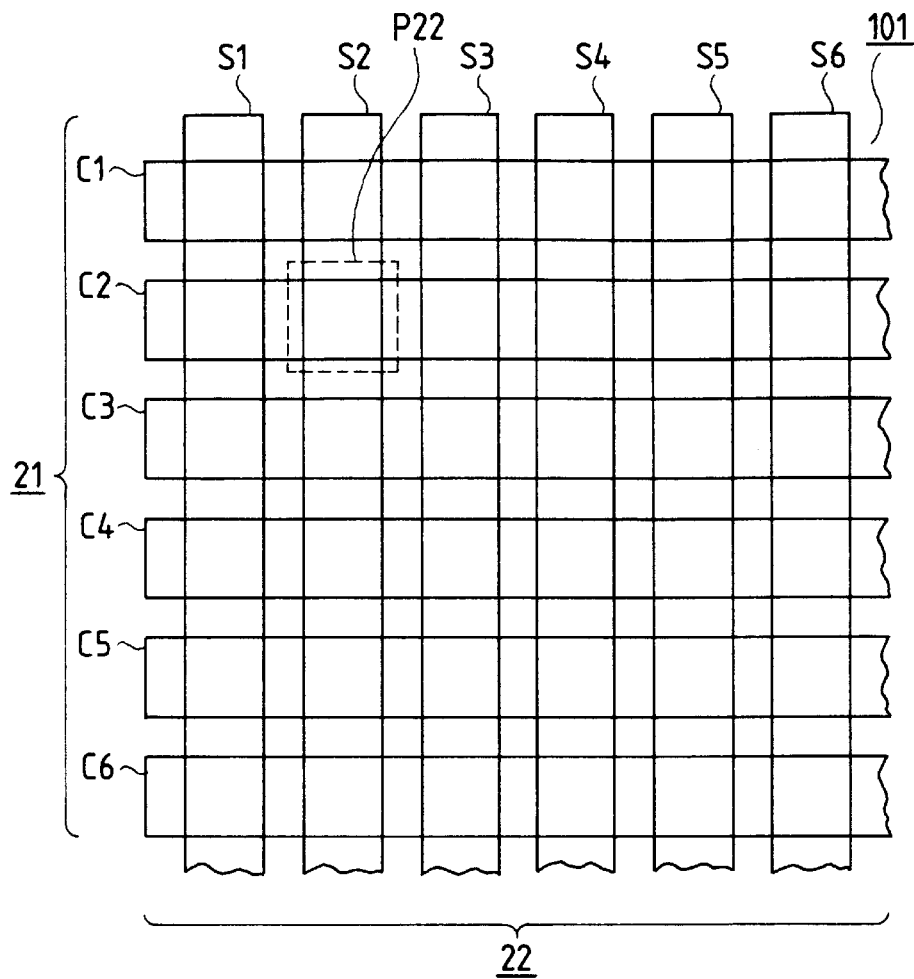
FIG. 11 is an enlarged view for the liquid cristal display unit.
Figure 12:
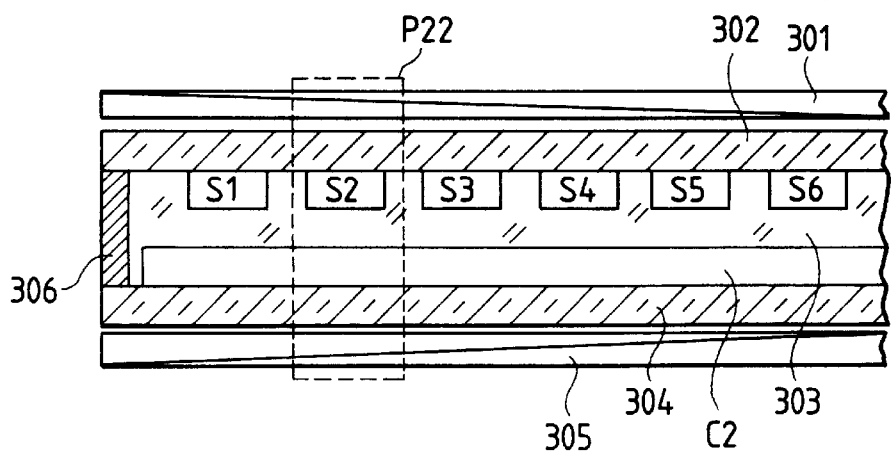
FIG. 12 is a sectional view for scanning electrode C2.

FIG. 11 is an enlarged view of the liquid crystal display 101. The liquid crystal display shown in FIG. 11 includes scanning electrodes C1 to C6, and information electrodes S1 to S6, which are arranged to form a matrix. A pixel P22 serving as a display unit is defined by the scanning and information electrodes. FIG. 12 is a sectional view including the scanning electrode C2 shown in FIG. 11. The liquid crystal display shown in FIG. 12 includes an analyzer 301 and a polarizer 305, which are arranged in a "crossed nicols" manner. The liquid crystal display also includes glass substrates 302 and 304, a ferroelectric liquid crystal 303, and a spacer 306.

Substrates, on each of which a polyimide film (not shown; LQ1802 available from Hitachi Kasei (KK)) was formed on the electrodes as an alignment film, were subjected to rubbing using nylon cloth, and were adhered to each other, so that the rubbing directions of the upper and lower substrates were shifted by 6° in a clockwise direction, thus preparing a cell. The cell thickness was 1.3 μm. The above-mentioned liquid crystal A having the spontaneous polarization value Ps of −5.6 $nC/cm^2$ at 30° C., and the above-mentioned phase change characteristics was injected into the cell, and was cooled to be set in an SC* phase, thus forming an SSFLC state. A pulse electric field was then applied to the entire cell to align the overall cell in one stable state. A rectangular wave alternating electric field having an electric field strength of ±3 V/μm and a frequency of 12.5 kHz was kept applied to the cell. As a result, almost no change in display state was observed even after an elapse of two days.

On the other hand, when a rectangular wave having an electric field strength of ±5 V/μm and a frequency of 12.5 kHz was kept applied to the same cell, a liquid crystal movement of 0.6 cm was observed in two days.

Note that the stable state was not transited to another state for either of the two application electric fields.

Substrates subjected to the same alignment treatment as the above cell were adhered to each other, so that their rubbing directions were anti-parallel to each other, and another liquid crystal was injected into a gap between the substrates. A pre-tilt angle was then measured by a crystal rotation method. The angle was about 17°.

Example 2

FIGS. 4 and 5, and Example 1 have discussed the electric field strength dependency of a flow velocity at a constant frequency (12.5 kHz).

Figure 9:
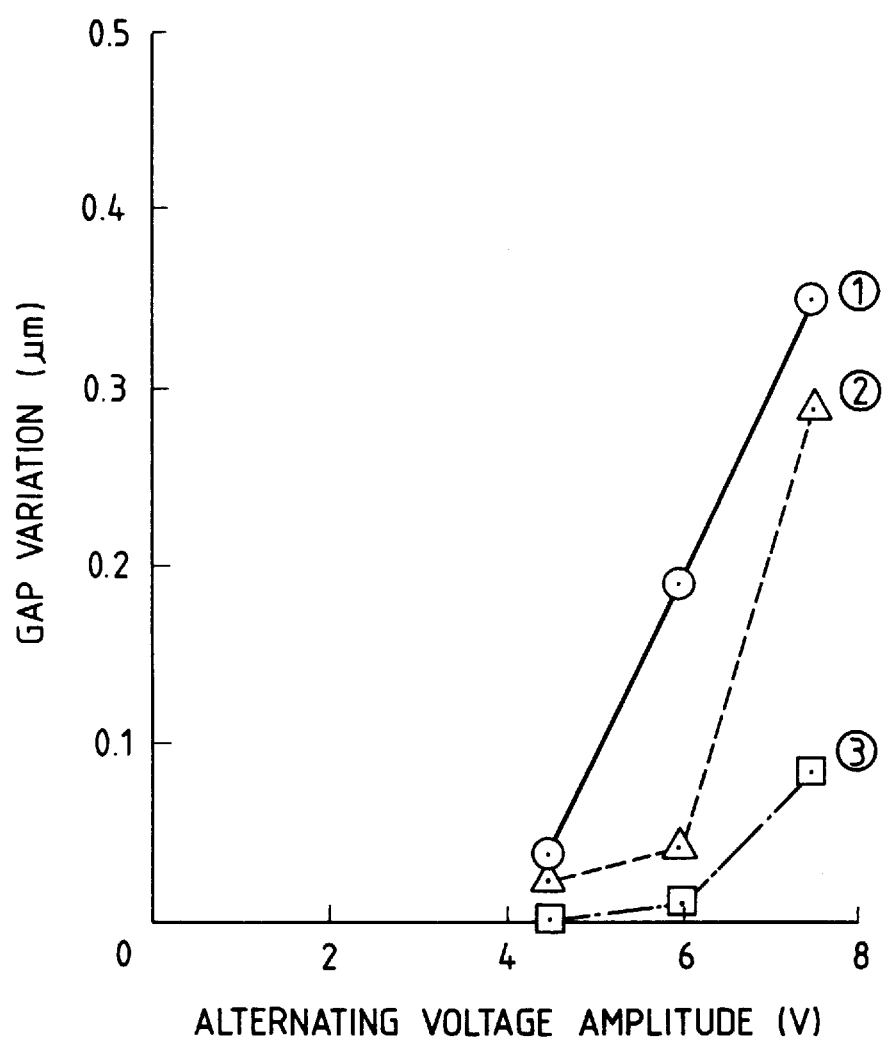
FIG. 9 is a view showing the experimental results in the second embodiment according to the present invention.
Figure 13:
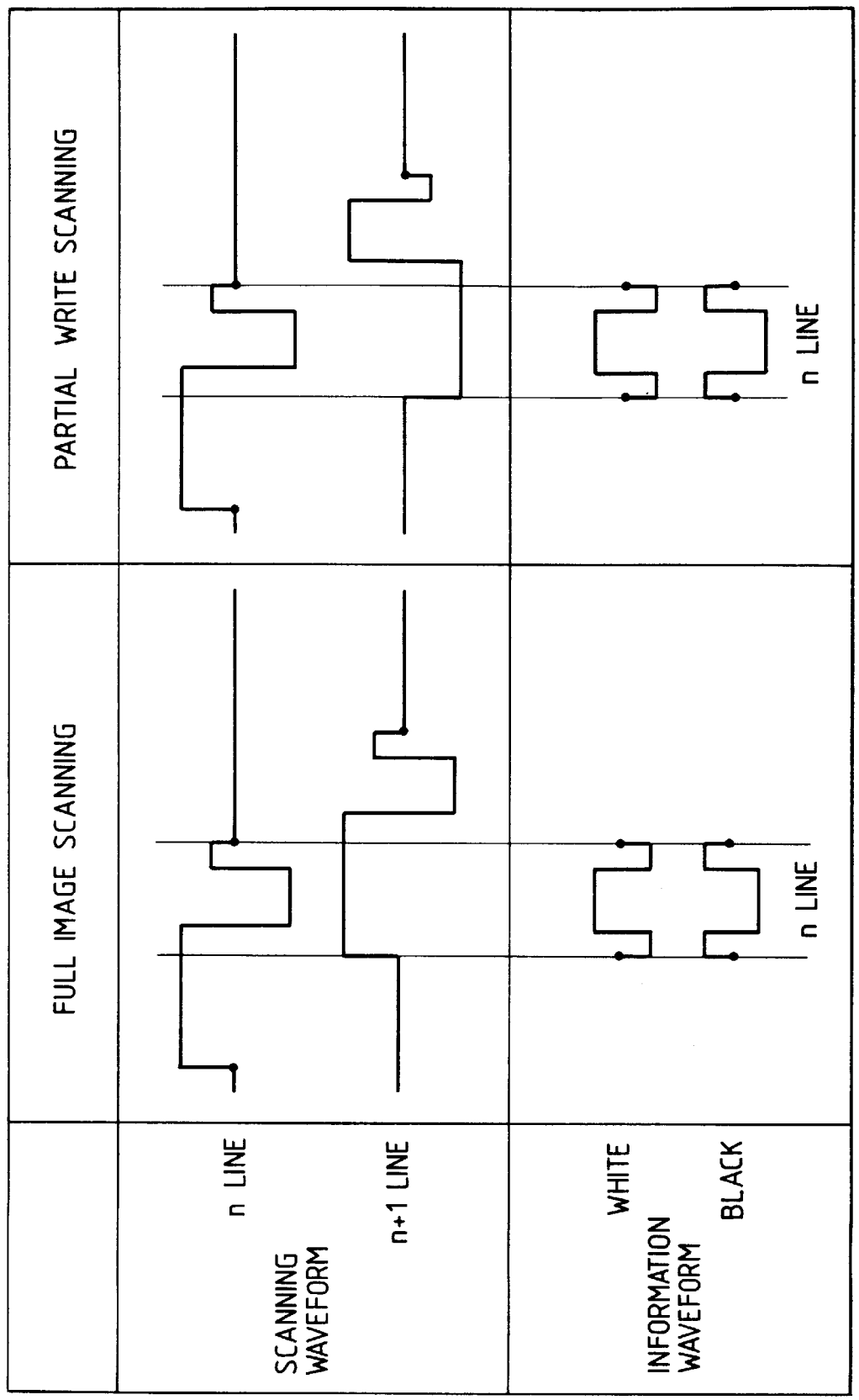
FIG. 13 is a view showing signal waveshapes for full scanning and partial write scanning.

In the case of a simple matrix display device, an alternating voltage (non-selection voltage) 33% (⅓ bias) to 25% (¼ bias) a threshold value is normally applied during a non-selection period wherein a display state is left unchanged, and to a corresponding area. FIG. 9 shows experimental results obtained when liquid crystals having phase series characteristics 1̂, 2̂, and 3̂ were injected into cells prepared following the same procedures as in Example 1, and an actual matrix drive waveform (bias ratio=1/3.3) shown in FIG. 13 was kept applied to the cells for 12 hours to flow the liquid crystals in one direction. A gap variation in a portion where a cell gap is changed due to deposition of the liquid crystal at the cell edge portion is plotted along the ordinate. The amplitude of the non-selection voltage is plotted along the abscissa. In this case, when the value of the non-selection voltage is changed to 4.5 V, 6 V, and 7.5 V, a frequency is changed accordingly, so that a selection pulse can coincide with a threshold value. Different frequencies are employed depending on types of liquid crystals. For example, in the case of the liquid crystal exhibiting the phase series characteristics 1̂, frequencies of 5.6 kHz, 8.2 kHz, and 11.1 kHz are used. As can be apparent from FIG. 11, the electric field dependency of a flow velocity in this case also has critical characteristics, and almost no flow was generated at 4.5 V or less.

What is claimed is:

1. A method of driving a liquid crystal element comprising a chiral smectic liquid crystal held between electrode substrates, the liquid crystal exhibiting ferroelectricity and being arranged to create a plurality of surface stabilization states according to an electric field applied through the electrode substrates, said driving method comprising the steps of:

(a) setting the value of an alternating voltage such that the value of an electric field generated by the alternating voltage within a liquid crystal portion between the electrode substances is within a range wherein no transition occurs;

(b) also setting the value of the alternating voltage to be no greater than an upper value which, when applied to the liquid crystal portion, generates a shear stress in the liquid crystal based on the drive force that is equal to the static frictional force between the surfaces of the electrode substrates and the molecules of the liquid crystal at the interface between the liquid crystal and the electrode substrates, so as to prevent the liquid crystal molecules from flowing at the substrate interface; and (c) applying said alternating voltage between the electrode substrates to the corresponding liquid crystal portion during a period for inhibiting transition of a surface stabilization state.

2. A method according to claim 1, further comprising the steps of: repetitively supplying scanning signals to a scanning electrode, and repetitively supplying information signals to an information electrode synchronously with the scanning signal, wherein an (n)th scanning signal overlaps with an (n+1)th scanning signal.

3. A method according to claim 2, wherein said scanning signals comprise a first voltage signal followed thereafter by a different second voltage signal, and said (n+1)th scanning signal commences before the second voltage signal of said (n)th scanning signal.

4. A method according to claim 3, wherein said scanning signals further comprise a third voltage signal following said second voltage signal, said third voltage signal having a voltage which is different from the first and second voltage signals.

5. A method of driving a liquid crystal comprising the steps of:

selecting a liquid crystal element comprising a chiral smectic liquid crystal held between a pair of substrates, wherein the liquid crystal exhibits ferroelectricity and is caused to flow by an electric field, the direction of flow being reversed according to a positive or negative polarity of the electric field; and applying a voltage containing an alternating voltage with a constant frequency to the liquid crystal, the alternating voltage comprising a positive polarity to cause the liquid crystal flowing in a first direction and a negative polarity to cause the liquid flowing in a second direction, wherein a sum of said flowing in the first direction and said flowing in a second direction is zero.

6. A liquid crystal element comprising:

a chiral smectic liquid crystal held between a pair of substrates, wherein the liquid crystal exhibits ferroelectricity and flows upon application of an electric field, the direction of flow being reversed according to a positive or negative polarity of the electric field; and means for applying a voltage containing an alternating voltage with a constant frequency is applied to a liquid crystal, the alternating voltage comprising a positive polarity to cause the liquid crystal flowing in a first direction and a negative polarity to cause the liquid crystal flowing in a second direction, wherein a sum of said flowing in the first direction and said flowing in a second direction is zero.

* * * * *

UNITED STATES PATENT AND TRADEMARK OFFICE
CERTIFICATE OF CORRECTION

PATENT NO. : 5,805,129

DATED : September 8, 1998

INVENTOR(S) : YUTAKA INABA ET AL.

It is certified that error appears in the above-identified patent and that said Letters Patent is hereby corrected as shown below:

COLUMN 1

Line 49, "spray" should read --splay--.
    Line 59, "spray" should read --splay--.

COLUMN 3

Line 5, "cristal" should read --crystal--.

COLUMN 4

Line 33, "$E \leq 2$" should read --$E \geq 2$--.
    Line 48, "$\hat{2}$ and $\hat{3}$." should read --②and ③v.--.

UNITED STATES PATENT AND TRADEMARK OFFICE
CERTIFICATE OF CORRECTION

PATENT NO. : 5,805,129

DATED    : September 8, 1998

INVENTOR(S) : YUTAKA INABA ET AL.

It is certified that error appears in the above-identified patent and that said Letters Patent is hereby corrected as shown below:

COLUMN 8

Line 41, "$\hat{1}$, $\hat{2}$ and $\hat{3}$." should read --①, ②, and ③.--;

Line 55, "$\hat{1}$," should read --①,--.

COLUMN 10

Line 14, "liquid" should read --liquid crystal--.

Signed and Sealed this

First Day of June, 1999

Attest:

Q. TODD DICKINSON

Attesting Officer    Acting Commissioner of Patents and Trademarks